3,272,963
FLUX-COATED CARBIDE WELDING ROD
Rene D. Wasserman, Cummings Point, Stamford, Conn., and Joseph F. Quaas, Island Park, N.Y., assignors to Eutectic Welding Alloys Corporation, Flushing, N.Y., a corporation of New York
Filed Mar. 21, 1962, Ser. No. 181,304
4 Claims. (Cl. 219—146)

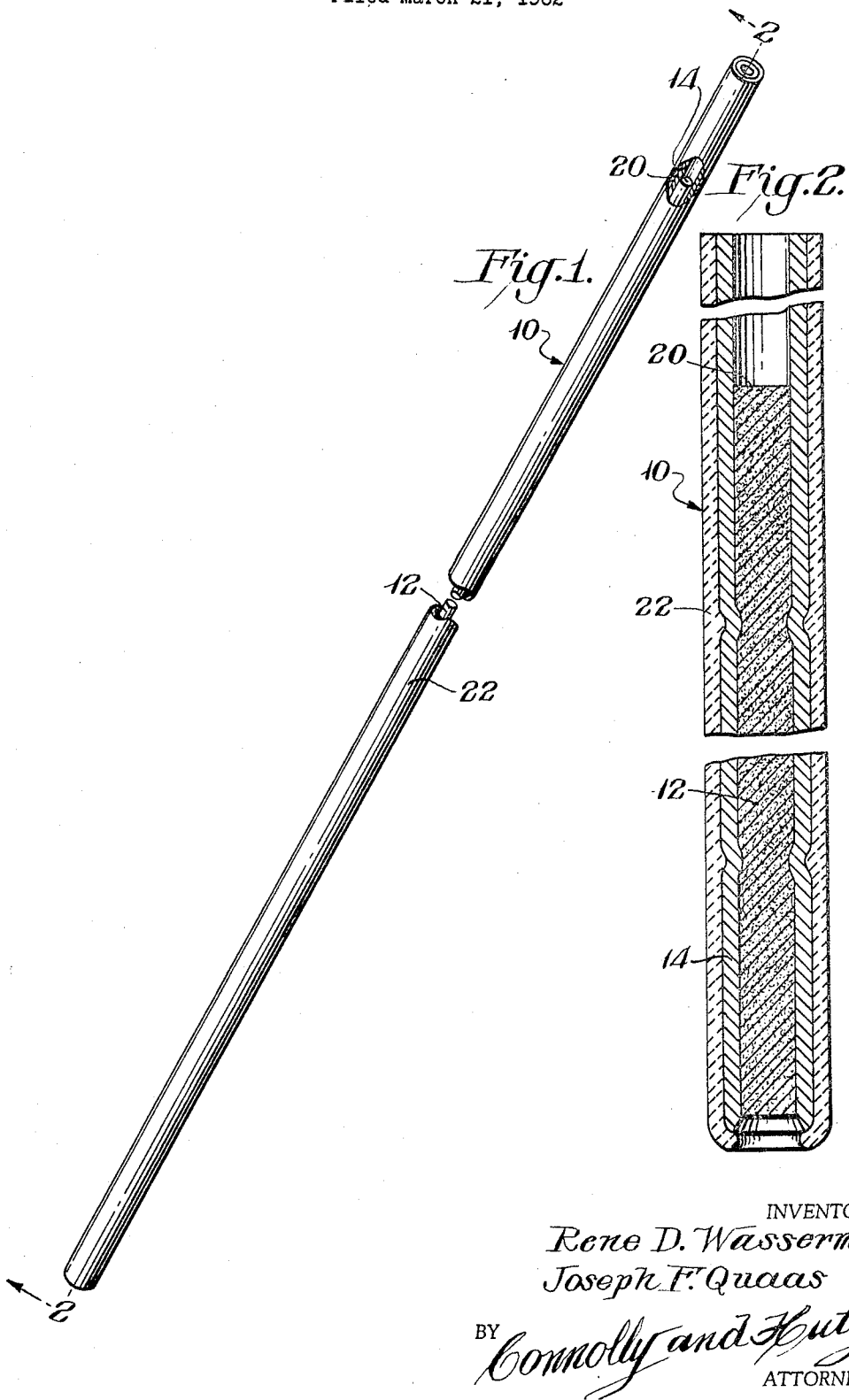

This invention relates to a flux-coated welding rod for depositing a carbide-laden surface layer upon a parent metal, and it more particularly relates to such a rod which deposits relatively high carbide densities.

Various welding rods have been proposed for depositing carbide surface layers upon parent metals. These rods have included carbide particles and binder metals for fusing the particles upon the parent material. However most of these rods have not permitted high carbide densities about 60% by weight to be deposited, and the carbide particles have also been highly susceptible to damage during deposition.

An object of this invention is to provide a welding rod for efficiently depositing high density carbide facings upon parent metals; and Another object is to provide such a rod which deposits relatively thin coatings of high carbide density with minimal damage to the carbides.

In accordance with this invention a mass of fine refractory carbide particles is compressed and sintered in the presence of small amounts of a metallic binder such as cobalt, nickel or molybdenum to fuse it together. An elongated relatively strong metal supporting rod is attached alongside the sintered carbide mass and attached to it by fusion or physical connection to prevent the brittle carbide mass from breaking during handling. This supporting rod is also capable of fusion with the fine carbide particles and the parent metal under depositing temperatures to provide a means for applying the carbide-laden surface layer upon the parent metal. A reaction flux incorporating carbon and metal powders is applied over the rod to make it possible to effectively deposit a high density carbide coating or surface layer including as much as 80% by weight of carbide upon the parent metal. The reason why such high carbide densities can be effectively deposited is not completely understood. However it is suspected that the reaction flux incorporating carbon and metal powder cooperates with the compressed and sintered core and its metallic binder to protect the carbide particles from being damaged by the welding heat, with a minimum amount of binder metal required in the ultimate deposit.

An effective rod of this type may be conveniently made by inserting a sintered carbide core within a thin relatively conductive metal tube, and a reaction type flux-coating advantageously includes fluorides, carbonates and carbon-forming constituents to prevent deterioration of the carbides during deposit.

A particularly advantageous example of a reaction flux for protecting rods of ferrous metals is as follows:

Constituent: Range
    Active metal fluorides _____ 5–35
    Alkaline earth carbonates _____ 20–70
    Carbon _____ 2–35
    Metallic powders _____ 5–60
    Chromium oxide _____ 1–5

Novel features and advantages of the present invention will become apparent to one skilled in the art from a reading of the following description in conjunction with the accompanying drawings wherein similar reference characters refer to similar parts and in which:

FIG. 1 is a three dimensional view of one embodiment of this invention; and

FIG. 2 is a cross-sectional view taken through FIG. 1 along the line 2—2.

In FIG. 1 is shown a welding rod 10 of this invention for depositing a carbide-laden facing upon a parent metal, such as mild steel, by either torch or arc welding procedures. Rod 10 includes a sintered carbide core 12 inserted within a tube 14 and secured within it for example by inwardly crimped indentations 16 at various points about the periphery of tube 14 shown in FIG. 2. In addition the bottom end 18 of tube 14 is inwardly deformed about the bottom of core 12. FIGS. 1 and 2 also illustrate that the top 20 of core 12 is downwardly spaced a short distance, such as for one inch, from the top of tube 14 to avoid wasting the more expensive carbides in the portion of the rod gripped in a holder.

Core 12 is a sintered carbide mass, such as of tungsten carbide, incorporating a conventional carbide binder such as cobalt, nickel or modybdenum. It is made by extruding a mass of relatively fine refractory carbide particles approximately 325 mesh or finer. These refractory carbides may be composed of any one of the carbides of metals such tungsten, molybdenum, vanadium, titanium or columbium. These particles are mixed with a small amount such as 6 or 8% of a binder metal such as cobalt, molybdenum or nickel and pressed into an elongated rod form in a hydraulic press under high pressures to densely compact the mass. This mass is then sintered in a hydrogen furnace for example at 2400° F. to cause the binder to consolidate the mass and protect the carbide particles. This mass is very hard but brittle, and it is accordingly protected from breaking by attachment to a rod of a relatively strong and durable metal. This rod may for example be made in the form of a tube 14 within which carbide mass 12 is inserted. It is also possible to extrude the carbides about the outside of the supporting rod or to insert the carbides into a strip of metal which is later rolled to form a tube which encloses the sintered carbides.

As shown in FIGS. 1 and 2, rod 10 is covered with a flux coating 22, which remarkably facilitates deposition of the carbide coating and accordingly deposits extremely thin facing with high carbide concentrations. This provides maximum hardness with the use of minimum amount of expensive hard carbide material. This flux coating can be formulated as set forth in the following table.

| Constituent | Percent by Weight Range | Example |
|---|---|---|
| Active metal fluoride, such as calcium, potassium and sodium | 5–35 | 17 |
| Alkaline earth metal carbonates such as calcium, barium and strontium | 20–70 | 33.5 |
| Carbon | 2–35 | 15 |
| Metallic powder, such as chromium, titanium, boron, vanadium, columbium and molybdenum, aluminum and silicon | 5–60 | 31.5 |
| Chromium oxide | 1–5 | 4.0 |

When such a rod is formulated with a sintered carbide core 12 having a cobalt binder inserted in a tube 14 made of aluminum bronze and a coating as set forth in the example in the aforegoing table utilizing calcium fluoride and carbonate and a mixture of the indicated metal powders, it provides a remarkably thin and dense carbide coating upon a steel parent material having a hardness ranging between 60 and 65 on the Rockwell "C" scale. Such results are quite unique for deposited carbide coatings.

The reason for the remarkable results of this invention are not completely understood, but it is believed that the density and distribution of carbides is facilitated by the formation of intermetallic carbides in the welding heat with the carbides being protected by the reaction flux. The high density of carbides also contributes maximum carbide density to the deposit. Such a welding rod therefore makes it possible to deposit hard carbide facings as thin as 1/16 inch when the rod is weaved during depositing to provide wide and flat bands of wear-resistant material.

The described flux coating provides remarkable wetting between the deposit and parent metal and facilitates the formation of intermetallic carbides such as iron and nickel with the tungsten and other refractory carbide-forming metals. Alloying agents such as chromium, molybdenum and cobalt also produce additional carbides, and the powdered metallics in the flux contribute to this action. In addition, the chromium oxide in the flux is reduced by the carbon to first release chromium which then combines with carbon to form chromium carbides which enhance the wear-resistance of the overlay. This invention also maintains the carbide in solution in the deposited metal thereby providing a remarkably homogenous weld metal structure.

What is claimed is:

1. A welding rod for depositing a refractory carbide-laden surface layer upon a parent metal comprising an elongated compressed and sintered mass of fine carbide particles, a metallic binder cementing said mass of fine carbide particles together, an elongated relatively strong metal member supporting said carbide mass, attaching means securing said carbide mass and supporting member together to permit said supporting member to protect said carbide mass from breaking, the metal composition of said supporting member being capable of fusion with said fine carbide particles and said parent metal, a flux coating upon said welding rod consisting essentially of the following constituents in the indicated ranges of percents by weight which are attached to said rod by a suitable binder:

| Constituent: | Percent by weight |
|---|---|
| Active metal fluorides | 5–35 |
| Alkaline earth metal carbonates | 20–70 |
| Carbon | 2–35 |
| Metallic powders | 5–60 |
| Chromium oxide | 1–5 |

2. A welding rod as set forth in claim 1 wherein said active metal fluoride is calcium fluoride, and said alkaline earth metal carbonate is calcium carbonate.

3. A welding rod as set forth in claim 2 wherein said metallic powders are selected from the group consisting of chromium, titanium, boron, vanadium, columbium, molybdenum, aluminum and silicon powders.

4. A welding rod as set forth in claim 1 wherein said binder is a water-soluble binder.

References Cited by the Examiner

UNITED STATES PATENTS

| 2,219,462 | 10/1940 | Wissler | 117—207 |
| 2,368,280 | 1/1945 | Wilson et al. | 117—206 |
| 2,798,824 | 7/1957 | LeGrand et al. | 117—206 |
| 2,875,104 | 2/1959 | Bergh et al. | 117—205 |
| 3,004,873 | 10/1961 | Strohmeier et al. | 117—207 |

ALFRED L. LEAVITT, *Primary Examiner.*

RICHARD D. NEVIUS, JOSEPH B. SPENCER, *Examiners.*

W. L. JARVIS, A. GOLIAN, *Assistant Examiners.*